US010480952B2

(12) United States Patent
Takhirov

(10) Patent No.: US 10,480,952 B2
(45) Date of Patent: Nov. 19, 2019

(54) PROBABILISTIC NAVIGATION SYSTEM AND METHOD

(71) Applicant: DiDi Research America, LLC, Mountain View, CA (US)

(72) Inventor: Zafar Takhirov, Mountain View, CA (US)

(73) Assignee: DiDi Research America, LLC, Mountain View, CA (US)

(*) Notice: Subject to any disclaimer, the term of this patent is extended or adjusted under 35 U.S.C. 154(b) by 53 days.

(21) Appl. No.: 15/886,196

(22) Filed: Feb. 1, 2018

(65) Prior Publication Data

US 2019/0234751 A1 Aug. 1, 2019

(51) Int. Cl.
*G01C 21/34* (2006.01)
*G08G 1/16* (2006.01)
*G01C 21/36* (2006.01)

(52) U.S. Cl.
CPC ..... *G01C 21/3461* (2013.01); *G01C 21/3626* (2013.01); *G01C 21/3697* (2013.01); *G08G 1/164* (2013.01)

(58) Field of Classification Search
CPC ........... G01C 21/3461; G01C 21/3626; G01C 21/3697; G08G 1/164
USPC ........................................................ 701/415
See application file for complete search history.

(56) References Cited

U.S. PATENT DOCUMENTS

| 9,656,606 B1* | 5/2017 | Vose ...................... B60Q 9/008 |
| 2018/0067966 A1* | 3/2018 | Oder ................... G06K 9/00791 |
| 2018/0141544 A1* | 5/2018 | Xiao ..................... G01S 13/862 |

OTHER PUBLICATIONS

Axelrod et al. "Provably Safe Robot Navigation with Obstacle Uncertainty", arXiv preprint 2017, https://arxiv.org/abs/1705.10907 (11 pages).
Schmerling et al. "Evaluating Trajectory Collision Probability through Adaptive Importance Sampling for Safe Motion Planning", arXiv preprint 2016, https://arxiv.org/abs/1609.05399 (9 pages).
Aoude et al. Probabilistically Safe Motion Planning to avoid Dynamic Obstacles with Uncertain Motion Patterns, Autonomous Robots Journal, vol. 35, Issue 1, Jul. 2013, https://dl.acm.org/citation.cfm?id=2505127.2505131 (27 pages).
Awad et al. "The Moral Machine experiment." Nature, vol. 563, Nov. 1, 2018, pp. 59-78 (20 pages).
Noothigattu et al. "A Voting-Based System for Ethical Decision Making" arXiv, Dec. 2018 (25 pages).

(Continued)

*Primary Examiner* — Marthe Y Marc-Coleman
(74) *Attorney, Agent, or Firm* — Sheppard Mullin Richter & Hampton LLP

(57) ABSTRACT

Systems and methods are provided for probabilistic navigation planning. An exemplary probabilistic navigation method may comprise: obtaining a map of an environment comprising one or more first objects each associated with a probability model; obtaining one or more global factors and local factors to update the probability models, wherein the global factors apply to all of the first objects and the local factors apply to a portion of the first objects; and determining a navigation for a second object through at least a part of the environment based at least on minimizing a total collision probability with the first objects along the navigation according to the updated probability models.

14 Claims, 7 Drawing Sheets

(56) References Cited

OTHER PUBLICATIONS

Shariff et al. "Psychological roadblocks to the adoption of self-driving vehicles" Nature Human Behaviour, vol. 1, Oct. 2017, 694-696 (3 pages).
Bonnefon et al. "The Social Dilemma of Autonomous Vehicles" Science, vol. 352, Issue 6293, Jun. 2016, pp. 1573-1576 (14 pages).

* cited by examiner

Static,
No global and
local factor update

Static,
With global factor update

Dynamic,
With local factor update

400

402: Obtaining a map of an environment comprising one or more first objects each associated with a probability model.

404: Obtaining one or more global factors and local factors to update the probability models, wherein the global factors apply to all of the first objects and the local factors apply to a portion of the first objects

406: Determining a navigation for a second object through at least a part of the environment based at least on minimizing a total collision probability with the first objects along the navigation according to the updated probability models

408: Controlling the second object to move according to the determined navigation, wherein the navigation comprises at least one of a route, a moving speed, or a moving direction

412: Obtaining a map of an environment comprising one or more first objects each associated with a probability model, wherein the probability model at least describes a probability field of colliding with the corresponding first object

414: Determining a navigation for a second object through at least a part of the environment based at least on minimizing a collision probability with the first objects along the navigation according to the probability models

416: Controlling second object to move according to the determined navigation, wherein the navigation comprises at least one of a route, a moving speed, or a moving direction

FIG. 4B

PROBABILISTIC NAVIGATION SYSTEM AND METHOD

TECHNICAL FIELD

This disclosure generally relates to probabilistic navigation methods and devices.

BACKGROUND

Navigation with dynamic and static obstacles is a problem that requires precise decision making with the help of perception-actuation feedback loop. Currently the solution is to identify an object, create a rigid bounding "no-touch-zone" around the object, and plan a path that avoids the object. This approach (rigid no-touch zone approach) cannot use tradeoffs, where one decision is practically sacrificed to achieve higher rewards in other metrics. In addition, the current approach lacks robustness when there are potential hazards. For example, a tree treated as a rigid object would be inaccurate in a windy day, since the probability of the tree falling and colliding with other objects increases. Therefore, existing technologies are inadequate to meet the ever-increasing demand for safe and precious navigation.

SUMMARY

Various embodiments of the present disclosure can include systems, methods, and non-transitory computer readable media for probabilistic navigation planning. According to one aspect, a probabilistic navigation method may comprise: obtaining a map of an environment comprising one or more first objects each associated with a probability model; obtaining one or more global factors and local factors to update the probability models, wherein the global factors apply to all of the first objects and the local factors apply to a portion of the first objects; and determining a navigation for a second object through at least a part of the environment based at least on minimizing a total collision probability with the first objects along the navigation according to the updated probability models. In some embodiments, the method may further comprise controlling the second object to move according to the determined navigation, wherein the navigation comprises at least one of a route, a moving speed, or a moving direction.

In some embodiments, the second object is a vehicle (e.g., (autonomous) car, boat, drone, etc.). The first objects comprise static and dynamic first objects. The static first objects are substantially stationary with respect to ground. The dynamic first objects are movable with respect to ground. The probability model at least describes a probability field of colliding with the corresponding first object, the probability field of collision decaying away from a physical boundary of the corresponding first object.

In some embodiments, the global factors comprise at least one of weather, global traffic condition, season, time, or geographic location of the environment. The local factors comprise at least one of: local event, local traffic condition, local road condition, or one or more of the first objects along the navigation.

In some embodiments, obtaining the local factors comprises using one or more sensors disposed at least on the second object or along a path of the navigation to monitor and dynamically update the local factors.

In some embodiments, obtaining the total collision probability with the first objects along the navigation comprises a summation of probabilities of colliding with the first objects along the navigation.

In some embodiments, determining the navigation for the second object through at least a part of the environment based at least on minimizing the total collision probability with the first objects along the navigation according to the updated probability models comprises: determining the navigation for the second object through at least a part of the environment based at least on (1) minimizing the total collision probability with the first objects along the navigation according to the updated probability models and (2) satisfying one or more constraints comprising at least one of: minimizing a trip time, minimizing a trip distance, minimizing a trip cost, limiting energy consumption, or fulfilling a user request.

According to another aspect, a probabilistic navigation method may comprise: obtaining a map of an environment comprising one or more first objects each associated with a probability model, wherein the probability model at least describes a probability field of colliding with the corresponding first object; and determining a navigation for a second object through at least a part of the environment based at least on minimizing a collision probability with the first objects along the navigation according to the probability models. In some embodiments, the method may further comprise controlling the second object to move according to the determined navigation, wherein the navigation comprises at least one of a route, a moving speed, or a moving direction.

According to another aspect, a probabilistic navigation system may comprise a processor and a non-transitory computer-readable storage medium storing instructions that, when executed by the processor, cause the system to perform a probabilistic navigation method. The method may comprise: obtaining a map of an environment comprising one or more first objects each associated with a probability model; obtaining one or more global factors and local factors to update the probability models, wherein the global factors apply to all of the first objects and the local factors apply to a portion of the first objects; and determining a navigation for a second object through at least a part of the environment based at least on minimizing a total collision probability with the first objects along the navigation according to the updated probability models.

According to another aspect, a probabilistic navigation system may comprise a processor and a non-transitory computer-readable storage medium storing instructions that, when executed by the processor, cause the system to perform a probabilistic navigation method. The method may comprise: obtaining a map of an environment comprising one or more first objects each associated with a probability model, wherein the probability model at least describes a probability field of colliding with the corresponding first object; and determining a navigation for a second object through at least a part of the environment based at least on minimizing a collision probability with the first objects along the navigation according to the probability models.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 4A illustrates a flowchart of an exemplary probabilistic navigation method, in accordance with various embodiments.

FIG. 4B illustrates a flowchart of another exemplary probabilistic navigation method, in accordance with various embodiments.

DETAILED DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

Current technologies for vehicle navigation commonly treat environmental objects as solid objects without accounting for their dynamicity. To at least mitigate such disadvantages, methods and systems for probabilistic navigation are disclosed, which can be applied on vehicles. The probabilistic navigation can be effectuated in terms of route planning, speed control, and/or direction control. That is, based on the disclosed methods, a vehicle can be controlled to move in a determined path, speed, and/or direction.

In some embodiments, the probabilistic navigation can be obtained by minimizing collision probabilities. A disclosed system may obtain a map of an environment (e.g., a metropolitan area) comprising one or more first objects (e.g., a tree, a pedestrian, a vehicle, a construction site) each associated with a probability model, obtain one or more global factors and local factors to update the probability models, and determine a navigation for a second object (e.g., a vehicle) through at least a part of the environment based at least on minimizing a total collision probability with the first objects along the navigation according to the updated probability models. The probability model of the each first object may capture the dynamicity of the object and predict a probability for the second object to collide with the first object. The probability models may be represented by probability fields distributed in the environment in association with the positions of the first objects. With real-time updates of the probability models and/or subjecting to various constraints (e.g., a maximum allowed travel time, an amount of remaining fuel), the disclosed system can determine the optimized navigation for the second object. According to the navigation, the second object may travel in a determined path, in a determined speeds, and/or in a determined direction.

Figure 1A:
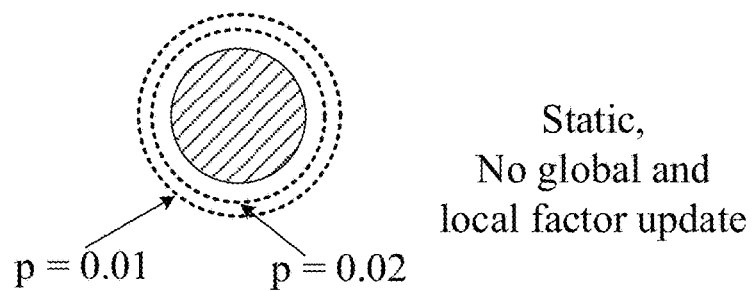
FIGS. 1A-1C illustrate exemplary probability models of first objects, in accordance with various embodiments.
Figure 1B:
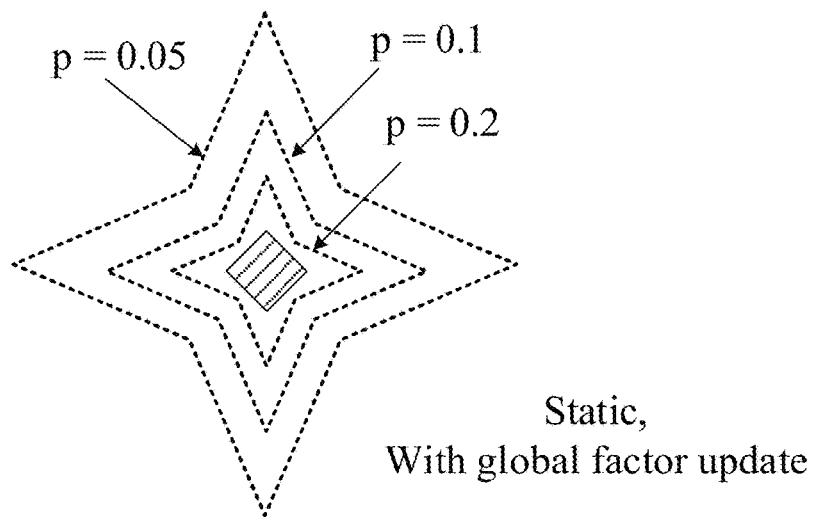
Figure 1C:
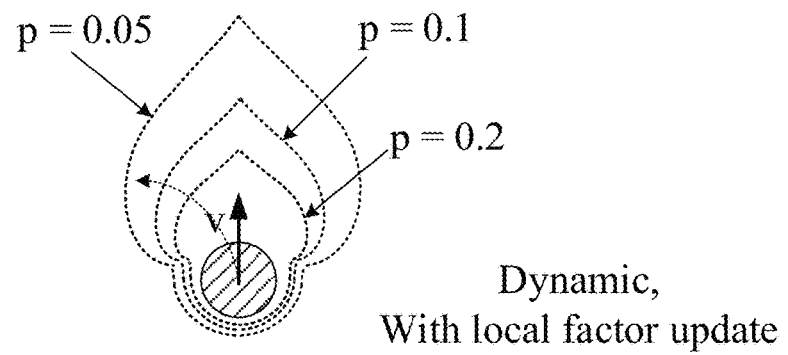

FIGS. 1A-1C are graphical representations illustrating exemplary probability models of first objects, consistent with exemplary embodiments of the present disclosure. The figures may illustrate a top-down view. In some embodiments, the first objects comprise static and dynamic first objects. The static first objects are substantially stationary with respect to ground, but may be displaced under external forces. The dynamic first objects are movable with respect to ground, and may be displaced under internal and/or external forces. The potential movements of the static and dynamic first objects can be simulated by the probability model that at least describes a probability field (shown as dash lines in the figures). The probability field lines may each indicate equal probabilities of colliding with the corresponding first object if the second object is present at the field locations. For example, each probability line may indicate the probability of the first object physically occupying the corresponding location (e.g., being displaced to the location corresponding to the field line). The probability field may decay away from a current physical boundary of the corresponding first object. The probability field density and shape may be determined by the physical properties of the first object (e.g., geometric structure, density, size, center of mass, moving speed, moving direction, etc.). A person of ordinary skill in the art would appreciate various ways for obtaining the probability fields. In one example, a continuous video capture of a first object for a preset time period can be taken. The video for the first object can be analyzed frame by frame to outline the positions of its physical boundary. By statistical calculation, a probability for observing the physical presence of the first object at each position can be obtained. Accordingly, a collision probability field for colliding with the first object can be plotted. In addition, various other methods for obtaining the probability fields can be found from, for example, Axelrod et al. "Provably Safe Robot Navigation with Obstacle Uncertainty," arXiv preprint 2017, Schmerling et al. "Evaluating Trajectory Collision Probability through Adaptive Importance Sampling for Safe Motion Planning," arXiv preprint 2016, and Aoude et al. Probabilistically Safe Motion Planning to avoid Dynamic Obstacles with Uncertain Motion Patterns, Autonomous Robots Journal, July 2013. All of the above articles are incorporated herein by reference.

Although the probability field density may vary depending on the rigidity of the first object, the illustrations in FIGS. 1A-1C have generalized such property for simplicity. Further, the field density and shape may be updated and/or created based on the global factors (e.g., weather, global traffic condition, season, time, geographic location of the environment) and/or local factors (e.g., local event, local traffic condition, local road condition, one or more of the first objects along the navigation) as described below.

FIG. 1A illustrates a probability field of collision of a static first object in a circular shape before any update. In some embodiments, the circular object may be a tree, a light pole, etc. Since this probability field is obtained without applying any global or local factor update, the circular object may be assumed to be stable by default (unless the nature of the object suggests instability), and the probability field may decay rapidly away from its physical boundary. For example, the collision probability at the first dash ring position is 0.02, and the collision probability at the second dash ring position is 0.01.

In some embodiments, default probability models (e.g., model of how to calculate/generate probability fields) for different first objects may be prestored. Various objects may have their corresponding default probability fields prestored in a memory (e.g., stored in the memory 306 or otherwise accessible to the computing system 302 described below), and the default probability fields may be predetermined based on a default structure, density, and/or other physical properties. For example, if the first object is a tree, a stored tree model can be invoked; if the first object is a building, a building model can be invoked; if the first object is a parked car, a car model can be invoked; if the first object is a moving car, a moving vehicle model can be invoked.

FIG. 1B illustrates a probability field of collision of another static first object in a square shape after a global factor update. In some embodiments, the square-shaped first object may be a building, a static vehicle, etc. In one example, assuming that the first object is inclined to topple over any of its four corner, the shape of the probability field of collision would extend from the four corners of the square and point outward. Before the global factor update (e.g., a windy weather condition) is applied, the probability field may decay quickly from the first object's physical boundary. After the global factor update, as shown in this figure, the probability field may appear to fan out and decay slower, indicating a greater likelihood to fall in the wind. Thus, as shown, the collision probability at the first dash position is 0.2, the collision probability at the second dash position is 0.1, and the collision probability at the third dash position is 0.05.

In some embodiments, the global factors (e.g., weather, global traffic condition, season, holiday, time-of-the-day, time-of-the-week, geographic location of the environment) may apply to all of the first objects. Taking weather as an example, in a rainstorm, the first objects such as trees, vehicles, and pedestrian may all be subject to the wind force and have a greater likelihood of losing control, thereby giving rise the collision probability for the respective probability model. In another example, for highway vehicles as the first objects, a heavy congestion may significantly slow down the traffic and lower the collision probability for the respective probability model. Different global factors may have different types or degrees of influence on the collision probabilities. The global factors may be obtained based on historical data, statistical data, real-time sensor detection, user entry, etc. In some embodiments, different first objects may apply the same global factor to different degrees. In other words, the same global factor may have different impacts on different first objects. For example, a global factor of "windy" may have a larger weight when applied to a probability model for trees, but have a smaller weight when applied to a probability model for buildings.

FIG. 1C represents a probability field of collision of a dynamic first object after a local factor update. In some embodiments, the second object may be a moving vehicle, a walking pedestrian, etc. In one example, the dynamic first object may not be previously included in the obtained map of the environment, may be previously treated as a static object in the obtained map of the environment, or may be previously treated as a dynamic object but with an inaccurate speed or direction in the obtained map of the environment. Such deficiencies can be cured by the local factor update. The local factor may be captured by sensors disposed at various locations, such as on the second object, on other vehicles, along roads, in the space, etc. Since the global factor may not be specific to individual first objects and may not have been updated to the real-time state of the first object, the local factor update based on real-time sensing results can accurately adjust the probability field of the dynamic and static first object.

Various moving first objects may have different probability fields of collision depending on their attributes. As shown, depending on the moving speed v of the first object, the probability field of the dynamic first object may assume a heart shape with sharp tail pointing to the moving direction. The tail end of the field may be limited by the maximum velocity of the first object, and the largest width of the field may be limited by the ability of the first object to turn. For example, a dash arrow in this figure indicates that a potential left-turn action of the first object, resulting in a corresponding probability field in the left-turn region. In the direction opposite to v, the field is relatively dense, due to a lower probability to move backwards when the first object is currently advancing at the speed v. In this example, the collision probability at the first dash position is 0.2, the collision probability at the second dash position is 0.1, and the collision probability at the third dash position is 0.05.

In some embodiments, the local factors (e.g., local event, local traffic condition, local road condition, one or more of the first objects along the navigation, any factor that applied to fewer than all of the first objects) may apply to a portion of the first objects (e.g., a specific first object). In one example, the local event may include various types such as conference, concert, protest, parade, construction, etc. The event may refer to an area where objects such as vehicles and people enter or exit, and the collision with the first object may comprise collision with an object associated with the first object. For example, if the first object is a construction site, the collision may involve vehicles and personnel entering or existing the construction site. Therefore, the local factor update for a construction site as a first object (e.g., the local factor being that the current time is during work hours) may increase the collision probability associated with the construction site. For another example, if the local event refers to student release time near a school zone, the collision probability of first projects in the school zone may increase significantly, causing the navigation of the second object to slow down the moving speed. Similarly, the event may also refer to a mobile group of objects (e.g., a marching group of people or a vehicle parade), and the collision probability of certain first objections around the mobile group may increase in the direction of the movement of the mobile group. For yet another example, the one or more of the first objects along the navigation path as the local factor may refer to a portion of the first objects that are close (e.g., within a threshold distance) to a navigation route, such that their states (e.g., positions, moving speeds, moving directions) are likely to affect the second object travelling along the path and the local factor updates are to be performed. Different local factors may have different types or degrees of influence on the collision probabilities. The local factors may be obtained based on historical data, statistical data, real-time sensor detection, user entry, etc.

Figure 2A:
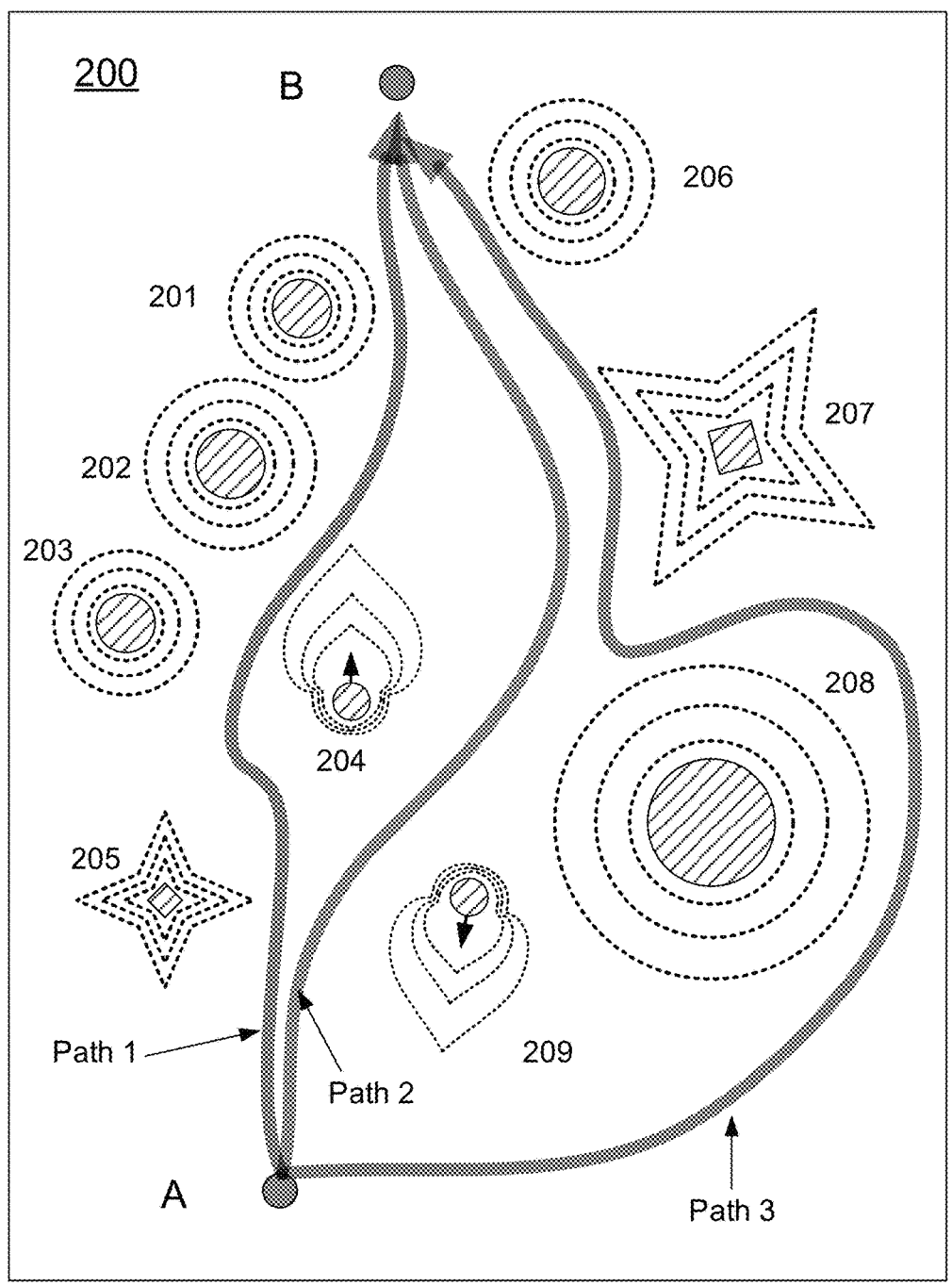
FIG. 2A illustrates an exemplary probabilistic navigation, in accordance with various embodiments.

FIG. 2A is a graphical presentation illustrating an exemplary probabilistic navigation, consistent with exemplary embodiments of the present disclosure. FIG. 2A may illustrate route/path planning based on the probabilistic navigation.

In some embodiments, a map 200 of an environment comprising one or more first objects 201-209 each associated with a probability model may be obtained, and one or more global factors and local factors may be obtained to update the probability models. In one global factor example, a weather condition affecting the entire environment may be accounted for as a global factor to update the respective probability models. In one local factor example, the one or more of the first objects along the navigation path 3 include first objects 206-209, and their properties (e.g., positions, moving speeds, moving directions) are monitored as local factors and used to update the probability models since their real-time status are more likely to affect a second object travelling along path 3. Accordingly, a navigation for each of one or more second objects through at least a part of the environment may be determined based at least on minimizing a total collision probability with any of the first objects along the navigation according to the updated probability models.

In some embodiments, the second object may be a vehicle (e.g., (autonomous) car, boat, drone, etc.). The local factors may be obtained via one or more sensors disposed at least on the second object, along a path of the navigation, or at another alternative location to monitor the local factors and dynamically update the probability models. Each of the one or more second objects may be controlled to move according to the determined navigation, wherein the navigation comprises at least one of a route, a moving speed, or a moving direction.

In some embodiments, as shown in this figure, to plan a route/path between the locations A and B, a plurality of potential paths (e.g., Path 1, Path 2 and Path 3) may be obtained. A total collision probability of each path can be calculated according to the above steps, and the path with the minimum total collision probability may be chosen as the planned path from the location A to B.

In some embodiments, obtaining the total collision probability with the first objects along the navigation comprises a summation of probabilities of colliding with the first objects along the navigation. Determining the navigation for a second object through at least a part of the environment based at least on minimizing the total collision probability with the first objects along the navigation according to the updated probability models comprises: determining the navigation for a second object through at least a part of the environment based at least on (1) minimizing the total collision probability with the first objects along the navigation according to the updated probability models and (2) satisfying one or more constraints. The constraints may comprise at least one of: minimizing a trip time, minimizing a trip distance, minimizing a trip cost (e.g., avoiding toll, least mileage, highway preference), limiting energy consumption, or fulfilling a user request (e.g., a stop-over place instructed by a driver, a sick passenger requiring medical attention). The constraint may sometimes be replaced by a benefit with similar algorithms.

In some embodiments, at any time t, the collision probability can be defined as $P(t_i)$. From each path in this figure, the total collision probability can be defined as the summation of the collision probability of all objects along the path $\Sigma P(t_i)$. The total trip time can be defined as $T=\Sigma_i t_i$. If the constraint is minimizing the total trip time. The navigation can be determined based on minimizing a sum of (1) the total collision probability $\rho P(t_i)$ and (2) $\lambda T$, where is $\lambda$ a weight for the time constraint T. When the weight for the constraint is small, the algorithm may indicate an emphasis on safety and leaves less flexibility to trade the constraint for safety.

In some embodiments, the constraints may be obtained based on historical data, statistical data, obtained from user input, etc. The constraints may also be modified or updated during usage. The total collision probability minimization and the each constraint may be each associated with a weight. The weights may be user-configurable. In one embodiment, in choosing a highest safety standard by a user, all weighting factors may be very small compared with the collision probability, and the result of probabilistic path planning may be a path with the minimum total collision probability. In another embodiment, a constraint may be set as $T_1 < T < T_2$ and given a large weight. Then among all potential paths with a total trip time T between $T_1$ and $T_2$, the path that has the minimum total collision probability may be chosen as the planned path. In another embodiment, a constraint may be set as "avoiding tolls" and given a large weight. Then a potential path that includes tollway, even though having the minimum collision probability, may not be chosen as the planned path.

Figure 2B:
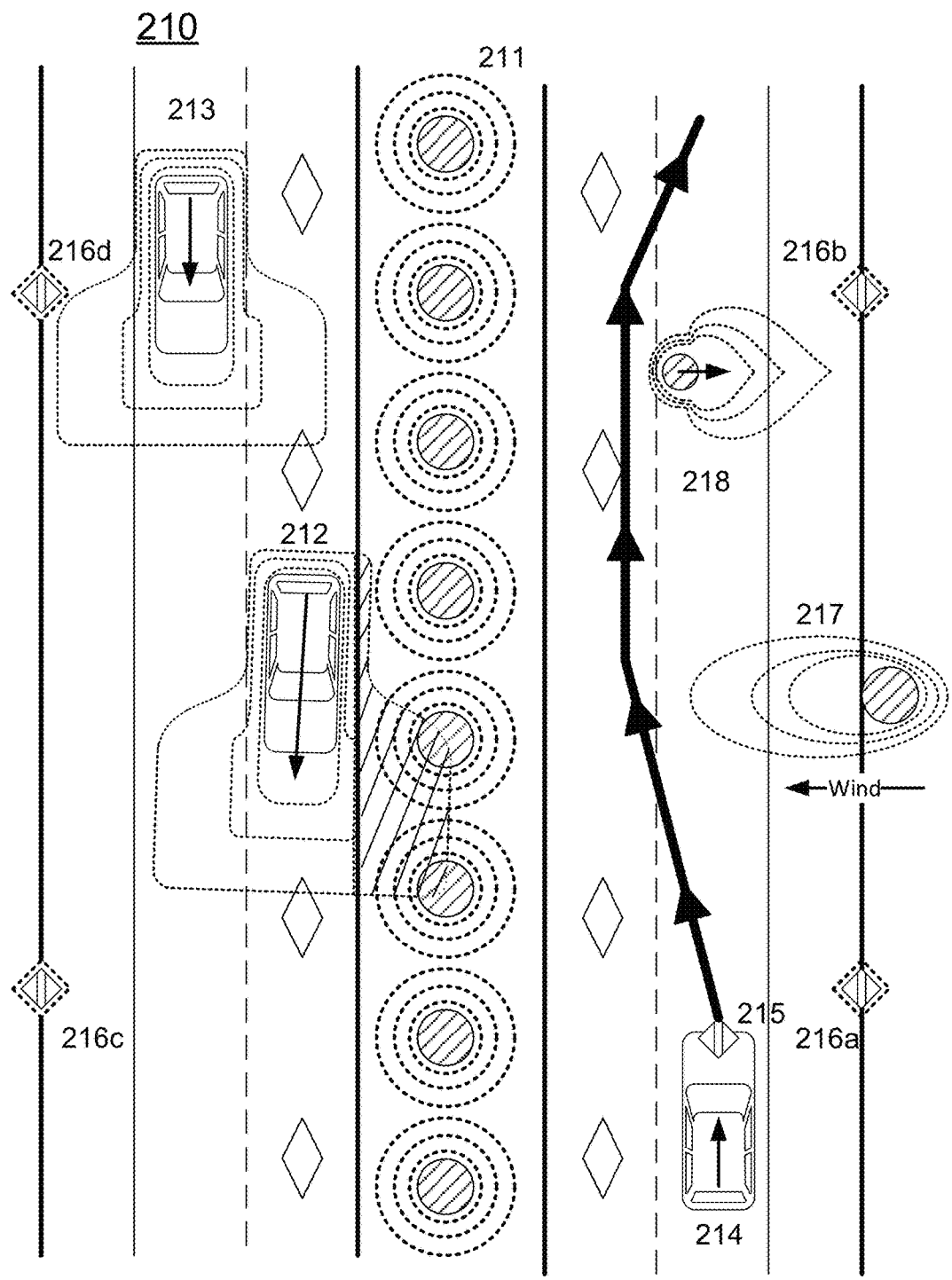
FIG. 2B illustrates another exemplary probabilistic navigation, in accordance with various embodiments.

FIG. 2B is a graphical presentation illustrating another exemplary probabilistic navigation, consistent with exemplary embodiments of the present disclosure. FIG. 2B illustrates vehicle control in an environment 210 based on the probabilistic navigation.

As shown, the environment 210 includes a section of a two-way highway. Each direction has three lanes: a carpool lane with diamond signs, a travel lane in the middle, and an emergency lane. The carpool lane and the travel lane are separated by a dash line, and the travel lane and the emergency lane are separated by a solid line. The two directions are separated by a row of trees 211. In this figures, two vehicles 212 and 213 are travelling in one direction, and another vehicle 214 is travelling in the opposite direction. The vehicle 214 carries a sensor 215. There are also sensors 216a-216d disposed on both sides of the highway. In the direction that the vehicle 214 is travelling, a giant tree 217 is wavering, and a deer 218 suddenly dashes from the trees 211 in panic.

In some embodiments, vehicle 214 is the second object, and all other objects in the environment 210 are the first objects. In this example, the vehicle 214 may be an autonomous vehicle or a vehicle equipped with computer-assisted driving, such that determined vehicle moving speed and/or moving direction can be automatically or semi-automatically implemented to the vehicle. Assuming that the disclosed system for probabilistic navigation is incorporated into the vehicle 214, as described above, the vehicle 214 may obtain the probability models for each of the first objects and update the models based on global and local factors. For example, the vehicle 214 may receive or detect the weather condition as the global factor for the update. The vehicle 214 may use the sensor 215 to locally monitor all first objects in its detection range and/or communicate with the sensors 216a-216d to obtain the local factors to update the probability models respectively. Accordingly, the updated probability models for the first objects are shown in dash lines around the corresponding first objects in this figure. The vehicle 212 is travelling in the carpool lane faster than the vehicle 213 and appears to prepare for exiting the carpool line. Thus, the probability field of the vehicle 212 is a bit more elongated than that of the vehicle 213, and points slightly towards the travel lane. The fanned out shape of the field for these two vehicles indicate the likelihood of the vehicles turning in various directions. For vehicle 213, without accounting for the carpool lane qualification and the presence of emergency, it is likely to switch to either the carpool lane or emergency lane. For vehicle 212, though possible (e.g., accident, vehicle malfunction), it is unlikely to turn into the greenery road belt. Thus, the vehicle 212's collision probability field is modified to account for the overlap (shaded area) with the trees 211—which is assigned a much lower probability. Similarly, the field configurations can be modified in various other situations.

On the other side of the highway, the vehicle 214 encounters some unexpected situations. Based on the updated probability models, the giant tree 217 immediately ahead has a likelihood of falling under a gust and obstructing both of the travel lane and the emergency lane, and the deer not much further away appears to be scampering off for sanctuary behind the emergency lane. Responding to the situations, the vehicle 214 determines the navigation to at least mitigate the potential dangers, prioritizing safety over all other constraints based on a user setting. Thus, despite that the vehicle 214 only carries a driver and does not qualify to use the carpool lane, the vehicle 214 effectuates a slower speed and a maneuver towards the carpool lane (shown in a thicken arrowed line). Once past the tree, the vehicle 214 stays in the carpool lane and only moves back to the travel lane after passing the probability field of the deer. Since the first objects can be precarious (e.g., the deer may stop in the middle of the road, or another animal may emerge from the trees 211), the vehicle 214 may continue monitoring the local factors and adjust the navigation (e.g., path, travel speed, travel direction) accordingly. Similarly, if other vehicles are close-by, the vehicle 214 can adjust the navigation accordingly, bringing all global and local factors into consideration. Extrapolating the described scheme to all vehicles in the environment, vehicle movements in an entire region can be managed by the disclosed system to provide safe navigation while satisfying personal needs.

Figure 3:
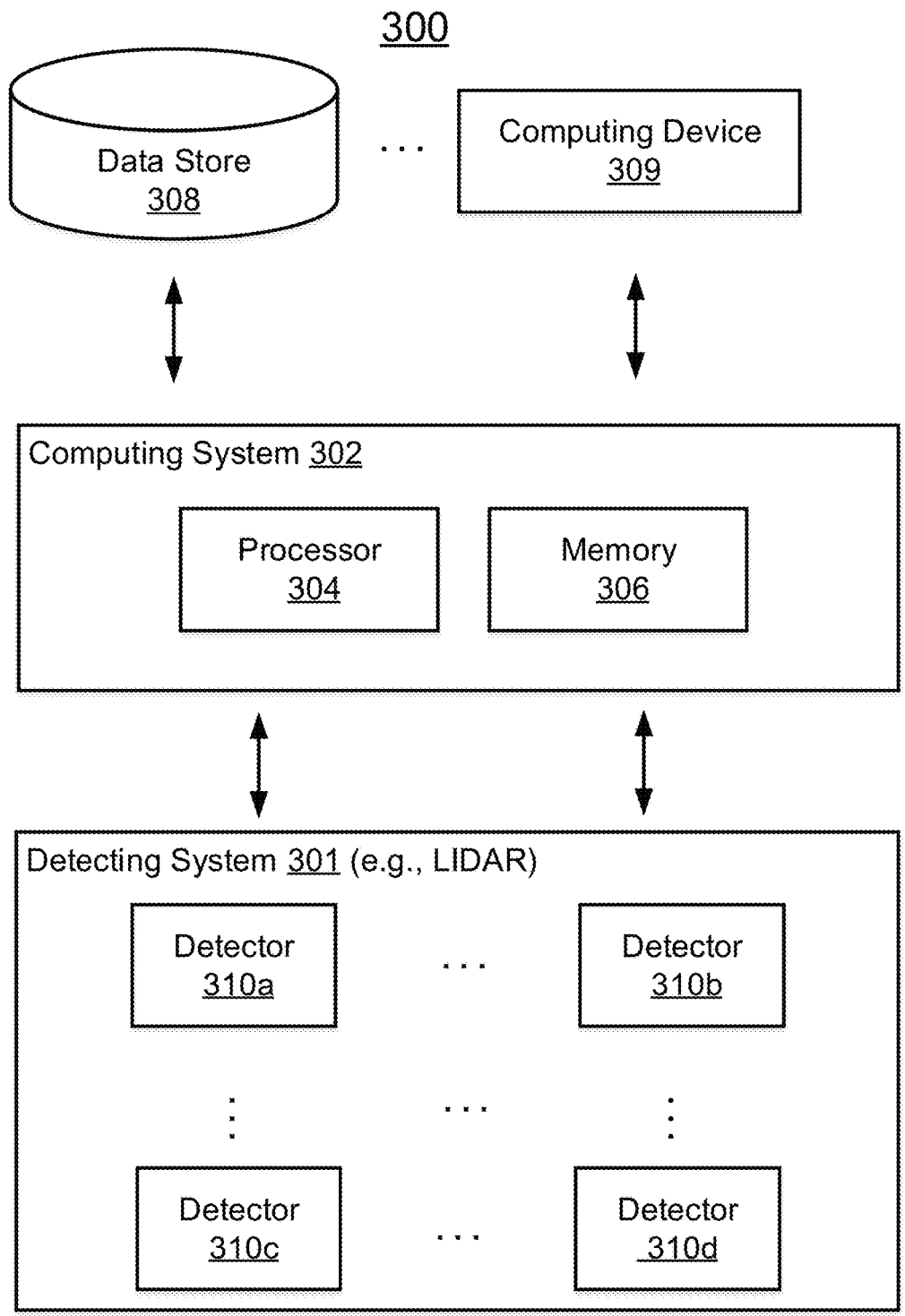
FIG. 3 illustrates an exemplary environment for probabilistic navigation, in accordance with various embodiments.

FIG. 3 illustrates an example environment 300 for probabilistic navigation, consistent with exemplary embodiments of the present disclosure. As shown in FIG. 3, the exemplary environment 300 may include at least one computing system 302 that includes one or more processors 304 and memory 306. The memory 306 may be non-transitory and computer-readable. The memory 306 may store instructions that, when executed by the one or more processors 304, cause the one or more processors 304 to perform various operations described herein. The computing system 302 may be implemented on or as various devices such as mobile phone, tablet, server, computer (e.g., vehicle computer, laptop), wearable device (e.g., smart watch), etc. The computing system 302 may be installed with appropriate software (e.g., data transfer program, etc.) and/or hardware (e.g., wire connections, wireless connections, etc.) to access other devices of the environment 300.

The environment 300 may include one or more data stores (e.g., a data store 308) and one or more computing devices (e.g., a computing device 309) that are accessible to the computing system 302. In some embodiments, the system 302 may be configured to obtain the global factors, local factors, and/or constraints from the data store 308 (e.g., a cloud database), the computing device 309 (e.g., a server, a mobile phone, a computer, a gyroscope), and/or a user input.

The environment 300 may further include a detecting system 301 coupled to the computing system 302. The detecting system 301 may comprise one or more detectors 310a, 310b, 310c, 310d, etc. In some embodiments, the detecting system 301 may comprise light detection and ranging (LIDAR) detectors. The detecting system may be configured to detect and/or recognize the local factors (e.g., a presence of a tree and its position relative to the second object, a presence of a nearby vehicle and its moving speed and direction). A person of ordinary skill in the art would appreciate the implementation of various other types of detectors in the detecting system 301 for detecting the local factors. A person of ordinary skill in the art would also appreciate the expansion of the detecting system 301's functionality to detect global factors (e.g., the weather) with appropriate sensors.

In some embodiments, the computing system 302 and the detecting system 301 may be disposed anywhere as long as the determined navigation can be effectuated on a corresponding vehicle. For example, the computing system 302 and the detecting system 301 may be both disposed on a vehicle to provide the navigation. For another example, the computing system 302 and the detecting system 301 may be distributed over an area over roadways (e.g., like the electronic toll system) to monitor all objects in the area, collectively determine the navigations for all vehicles in the area, and transmit the determined navigations to the vehicles respectively.

In some embodiments, the computing system 302 and the one or more of the computing devices (e.g., the computing device 309) may be integrated in a single device or system. Alternatively, the computing system 302 and the one or more computing devices may operate as separate devices. The one or more data store (e.g., the data store 308) may be anywhere accessible to the computing system 302, for example, in the memory 306, in the computing device 309, in another device (e.g., network storage device) coupled to the computing system 302, or another storage location (e.g., cloud-based storage system, network file system, etc.), etc. The computing system 302 may be implemented as a single system or multiple systems coupled to each other. In general, the computing system 302, the computing device 309, the data store 308, and the system 301 may be able to communicate with one another through one or more wired or wireless networks (e.g., the Internet) through which data can be communicated.

FIG. 4A illustrates a flowchart of an example probabilistic navigation method 400, consistent with exemplary embodiments of the present disclosure. The method 400 may be implemented in various environments including, for example, the environment 300 of FIG. 3. The exemplary method 400 may be implemented by one or more components of the system 302 (e.g., the processor 304, the memory 306) and/or the detecting system 301. The method 400 may be implemented by multiple systems similar to the system 302. The operations of method 400 presented below are intended to be illustrative. Depending on the implementation, the exemplary method 400 may include additional, fewer, or alternative steps performed in various orders or in parallel.

At block 402, a map of an environment comprising one or more first objects each associated with a probability model may be obtained. At block 404, one or more global factors and local factors to update the probability models may be obtained, wherein the global factors apply to all of the first objects and the local factors apply to a portion of the first objects. At block 406, a navigation for a second object through at least a part of the environment may be determined based at least on minimizing a total collision probability with the first objects along the navigation according to the updated probability models. At block 408, optionally, the second object may be controlled to move according to the determined navigation, wherein the navigation comprises at least one of a route, a moving speed, or a moving direction.

FIG. 4B illustrates a flowchart of an example probabilistic navigation method 410, consistent with exemplary embodiments of the present disclosure. The method 410 may be implemented in various environments including, for example, the environment 300 of FIG. 3. The example method 410 may be implemented by one or more components of the system 302 (e.g., the processor 304, the memory 306) and/or the detecting system 301. The method 410 may be implemented by multiple systems similar to the system 302. The operations of method 410 presented below are intended to be illustrative. Depending on the implementation, the exemplary method 410 may include additional, fewer, or alternative steps performed in various orders or in parallel.

At block 412, a map of an environment comprising one or more first objects each associated with a probability model may be obtained, wherein the probability model at least describes a probability field of colliding with the corresponding first object. At block 414, a navigation for a second object through at least a part of the environment may be determined based at least on minimizing a collision probability with the first objects along the navigation according to the probability models. At block 416, optionally, the second object may be controlled to move according to the determined navigation, wherein the navigation comprises at least one of a route, a moving speed, or a moving direction.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
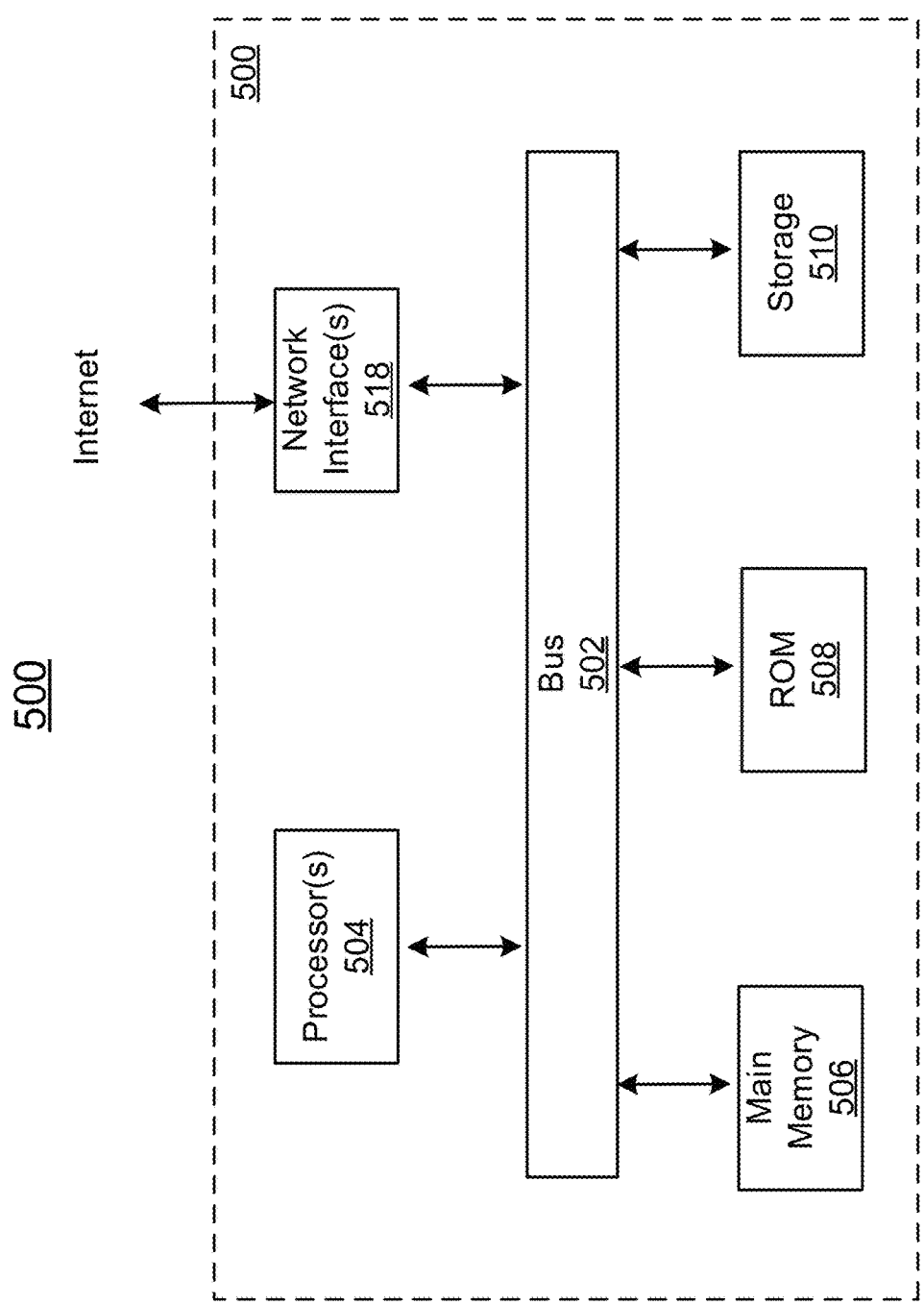
FIG. 5 illustrates a block diagram of an exemplary computer system in which any of the embodiments described herein may be implemented.

FIG. 5 is a block diagram that illustrates a computer system 500 upon which any of the embodiments described herein may be implemented. The system 500 may correspond to the system 302 or 303 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 304 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 306 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the operations, methods, and processes described herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A probabilistic navigation method, comprising:
obtaining a map of an environment comprising a plurality of first objects each associated with a probability model, the environment comprising a metropolitan area, and the plurality of first objects including a first static object of the metropolitan area and a first dynamic object of the metropolitan area, the probability model at least describing probability fields of a second object colliding with each of the plurality of first objects, the probability fields decaying away from one or more physical boundaries of each of the plurality of first objects, the density and shape of each the probability fields being based on one or more physical properties of a corresponding first object of the plurality of first objects, the second object comprising an autonomous vehicle;
obtaining one or more global factors, the one or more global factors including a global weather condition;
obtaining one or more local factors, the one or more local factors including a local road condition, the one or more local factors being captured by one or more sensors disposed on the second object;
updating the probability fields of the probability models based on the one or more global factors and the one or more local factors, wherein the global factors relatively apply to all of the first objects, and the local factors apply to a portion of the first objects, wherein at least a first global factor has a first degree of influence for the first static object and the first global factor has a second degree of influence for the first dynamic object, the first degree of influence being different from the second degree of influence, the updating including adjusting a rate of decay for at least one of the probability fields of a corresponding probability of the plurality of probability models; and
determining a navigation for the second object through at least a part of the environment based at least on minimizing a total collision probability of the second object with the plurality of first objects along the navigation according to the updated probability models;
autonomously causing, in response to determining the navigation, the navigation of the second object through at least the part of the environment.

2. The method of claim 1, wherein:
the static first objects are substantially stationary with respect to ground; and
the dynamic first objects are movable with respect to ground.

3. The method of claim 1, wherein:
the global factors further comprise at least one of global traffic condition, season, time, or geographic location of the environment; and
the local factors further comprise at least one of: local event, local traffic condition, or one or more of the first objects along the navigation.

4. The method of claim 1, wherein obtaining the local factors further comprises using one or more sensors disposed along a path of the navigation to monitor and dynamically update the local factors.

5. The method of claim 1, wherein the total collision probability with the first objects along the navigation comprises a summation of probabilities of colliding with the first objects along the navigation.

6. The method of claim 1, wherein determining the navigation for the second object through at least a part of the environment based at least on minimizing the total collision probability with the first objects along the navigation according to the updated probability models comprises:
determining the navigation for the second object through at least a part of the environment based at least on (1) minimizing the total collision probability with the first objects along the navigation according to the updated probability models and (2) satisfying one or more constraints comprising at least one of: minimizing a trip time, minimizing a trip distance, minimizing a trip cost, limiting energy consumption, or fulfilling a user request.

7. The method of claim 1, further comprising controlling the second object to move according to the determined navigation, wherein the navigation comprises at least one of a route, a moving speed, or a moving direction.

8. A probabilistic navigation system, comprising
a processor; and
a non-transitory computer-readable storage medium storing instructions that, when executed by the processor, cause the system to perform a probabilistic navigation method, the method comprising:
obtaining a map of an environment comprising a plurality of first objects each associated with a probability model, the environment comprising a metropolitan area, and the plurality of first objects including a first static object of the metropolitan area and a first dynamic object of the metropolitan area, the probability model at least describing probability fields of a second object colliding with each of the plurality of first objects, the probability fields decaying away from one or more physical boundaries of each of the plurality of first objects, the density and shape of each the probability fields being based on one or more physical properties of a corresponding first object of the plurality of first objects, the second object comprising an autonomous vehicle;
obtaining one or more global factors, the one or more global factors including a global weather condition;
obtaining one or more local factors, the one or more local factors including a local road condition, the one or more local factors being captured by one or more sensors disposed on the second object;
updating the probability fields of the probability models based on the one or more global factors and the one or more local factors, wherein the global factors relatively apply to all of the first objects, and the local factors apply to a portion of the first objects, wherein at least a first global factor has a first degree of influence for the first static object and the first global factor has a second degree of influence for the first dynamic object, the first degree of influence being different from the second degree of influence, the updating including adjusting a rate of decay for at least one of the probability fields of a corresponding probability of the plurality of probability models; and
determining a navigation for the second object through at least a part of the environment based at least on minimizing a total collision probability of the second object with the plurality of first objects along the navigation according to the updated probability models;

autonomously causing, in response to determining the navigation, the navigation of the second object through at least the part of the environment.

9. The system of claim 8, wherein:

the static first objects are substantially stationary with respect to ground; and the dynamic first objects are movable with respect to ground.

10. The system of claim 8, wherein:

the global factors further comprise at least one of global traffic condition, season, time, or geographic location of the environment; and the local factors further comprise at least one of: local event, local traffic condition, or one or more of the first objects along the navigation.

11. The system of claim 8, wherein obtaining the local factors further comprises using one or more sensors disposed along a path of the navigation to monitor and dynamically update the local factors.

12. The system of claim 8, wherein the total collision probability with the first objects along the navigation comprises a summation of probabilities of colliding with the first objects along the navigation.

13. The system of claim 8, wherein determining the navigation for the second object through at least a part of the environment based at least on minimizing the total collision probability with the first objects along the navigation according to the updated probability models comprises:

determining the navigation for the second object through at least a part of the environment based at least on (1) minimizing the total collision probability with the first objects along the navigation according to the updated probability models and (2) satisfying one or more constraints comprising at least one of: minimizing a trip time, minimizing a trip distance, minimizing a trip cost, limiting energy consumption, or fulfilling a user request.

14. The system of claim 8, wherein the method further comprises:

controlling the second object to move according to the determined navigation, wherein the navigation comprises at least one of a route, a moving speed, or a moving direction.

\* \* \* \* \*